(12) United States Patent
Shen et al.

(10) Patent No.: US 11,954,837 B2
(45) Date of Patent: Apr. 9, 2024

(54) IMAGE ENHANCEMENT SYSTEM BASED ON NONLOCAL FEATURES

(71) Applicant: Black Sesame Technologies Inc., San Jose, CA (US)

(72) Inventors: Shanlan Shen, Singapore (SG); Yubo Duan, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 33 days.

(21) Appl. No.: 17/545,624

(22) Filed: Dec. 8, 2021

(65) Prior Publication Data
US 2023/0177651 A1 Jun. 8, 2023

(51) Int. Cl.
*G06T 5/70* (2024.01)
*G06T 5/73* (2024.01)
*G06V 10/77* (2022.01)

(52) U.S. Cl.
CPC ............. *G06T 5/70* (2024.01); *G06T 5/73* (2024.01); *G06V 10/7715* (2022.01); *G06T 2207/20084* (2013.01)

(58) Field of Classification Search
CPC .... G06T 5/70; G06T 5/73; G06T 5/60; G06T 2207/20084; G06V 10/7715
See application file for complete search history.

(56) References Cited

U.S. PATENT DOCUMENTS

| | | | |
|---|---|---|---|
| 9,087,390 B2 | 7/2015 | Jin et al. | |
| 9,349,164 B2* | 5/2016 | Wang | G06T 5/70 |
| 10,453,249 B2 | 10/2019 | Smirnov et al. | |
| 10,970,598 B1* | 4/2021 | Ryu | G06V 20/56 |
| 11,521,377 B1* | 12/2022 | Wang | G06V 20/13 |
| 2019/0156210 A1 | 5/2019 | He et al. | |
| 2019/0287215 A1* | 9/2019 | Schroers | G06T 5/73 |
| 2020/0099944 A1 | 3/2020 | Chen et al. | |
| 2023/0098437 A1* | 3/2023 | Li | G06T 3/4038 382/299 |
| 2023/0274479 A1* | 8/2023 | Choi | G06F 40/30 345/629 |

FOREIGN PATENT DOCUMENTS

CN 109360156 2/2019

* cited by examiner

*Primary Examiner* — John B Strege
(74) *Attorney, Agent, or Firm* — Timothy T. Wang; Ni, Wang & Massand, PLLC

(57) ABSTRACT

The present invention discloses system and method for enhancing an image based on non-local features. The invention includes an end-to-end trainable and guided method including feature extraction block, non-local feature generator and non-local feature enhancement block, to deal with low-level image problem by using the non-local feature concept. The invention also deploys a non-local feature merge block to rectify translated features and improve non-local feature further to finally reconstruct the rectified features to form an enhanced image.

19 Claims, 12 Drawing Sheets

IMAGE ENHANCEMENT SYSTEM BASED ON NONLOCAL FEATURES

FIELD OF INVENTION

The present invention generally relates to systems and methods for enhancing an image. More specifically, the present invention is directed to processing an image based on non-local features

BACKGROUND OF THE INVENTION

In image processing, we could use similarity pixels or features to do denoise, deblur, super-resolution, etc. However, if we want to find more close similarity features, more calculation needs to pay. Especially in the traditional way, it is not only inefficient but imprecise. Recently, deep-learning models can reach a good performance at many image processing tasks which need pixel relationship to solve problem, such as super-resolution, de-noising, multi-frame system image or video enhancement, etc.

An issued U.S. Pat. No. 9,087,390 assigned to Adobe Inc. discloses a technology related to up-scaling an image sequence. Furthermore, the patent discloses an up-sampled frame is generated based on an original frame in an original image sequence comprising a number of frames. Though the patent provides up-scaling of the image to introduce noise or magnify the existing noise in the image. Still lacks to provide an end-to-end trainable and guided system or method.

Another US patent application 20190156210 assigned to Facebook Inc. discloses a technology related to image and video analysis using machine learning within network environments, and in particular relates to hardware and software for smart assistant systems. Though, the invention is advancement to prior patent as it includes machine learning. Still, the invention fails to provide a cost-effective and precisely enhancing the images.

Another CN patent application 109360156 assigned to Shanghai Jiaotong University provides a single image rain removing method or system based on the image block for generating confrontation network. Though, the invention in view of the above shortcomings of the prior art, provides a kind of based on the image block for generating confrontation network Single image rain removing method, for solving the problems, such as the recovery of captured single image under various types of rainy days. Still, the patent lacks the capability of enhancing images with multiple frames as the system mainly focuses on removing rain from the image.

The present invention seeks to provide a system and method for enhancing an image. More specifically, the present invention is directed to processing an image based on non-local features. Moreover, to improve non-local performance and exploit the ability of deep-learning network, we propose an end-to-end trainable and guided method, including feature extraction block, non-local feature generator, non-local feature enhancement block, to deal with low-level image problem by using the non-local feature concept. The system can do flexible image enhancement by creating non-local features for multi-frame or single-frame system. This system needs only a few computational costs to get enhanced image against other deep learning based non-local approach.

Therefore to overcome the shortcomings of the prior-arts like handle challenging components of human body such as hair and hand, there is a need to provide a hierarchical hybrid loss instead of traditional segmentation loss. The hierarchical hybrid loss is presented with designed weights. Finally, to custom the application of human portrait segmentation and reduce the learning space dimension, a unique data augmentation strategy is innovated which uniform the training data distribution to achieve more stable performance and fast convergence. In view of the foregoing inventions, there is a need in the art for a system to overcome or alleviate the before mentioned shortcomings of the prior arts.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced image processing system that performs image enhancement based on non-local features.

SUMMARY OF THE INVENTION

The invention proposes an end-to-end trainable and guided method, including feature extraction block, non-local feature generator, non-local feature enhancement block, to deal with low-level image problem by using the non-local feature concept.

Image(s) could be sent into Feature Extraction Block (FEB) to extract features. A set of abstract features is ready to generate non-local features by Non-local Feature Generator (NLFG). NFG translates features in 9 directions with a manually designed shift to create non-local condition. Then, Non-local Feature Enhancement Block (NLFEB) takes these non-local features to do image enhancement operation. In NLFEB, we introduce non-local feature merge block (NLFMB) model to reveal the relationship of feature pixels. NLFMB can rectify translated features and improve non-local feature further, Finally, Rectified features can be reconstructed by next model with proper condition maps for unique enhancement purpose.

The image processing system for processing an image based on non-local features. The image processing system includes a feature extraction module for receiving the image, the feature extraction module includes a processing unit and an extraction unit. The processing unit processes at least one frame of the image to generate a number of feature merge layers. The processing unit concatenates at least one of the number of feature merge layers with a condition map to form one or more merged feature maps. The extraction unit extracts a number of feature extraction layers from the one or more merged feature maps, the extraction unit extracts multiple features from the number of feature extraction layers.

The non-local feature generator includes a shifting unit and a padding unit. Moreover, the shifting unit applies a shill in nine distinct directions on the multiple features to form multiple feature translation layers. The padding unit fixes the shift on the multiple feature translation layers by applying padding and cropping operations to form one or more translated feature maps.

The non-local feature enhancement module includes a merging unit, a reconstruction unit and a concatenating unit. The merging unit merges the one or more translated feature maps to form one or more non-local merged feature maps. The reconstruction unit constructs a number of reconstruction layers from the one or more non-local merged feature maps. The concatenating unit concatenates the number of reconstruction layers with the condition map to form an enhanced image.

The primary objective of the present invention is to provide a system which can do flexible image enhancement by creating non-local features for multi-frame or single-frame system. The system needs only a few computational costs to get enhanced image against other deep learning based non-local approach. The system provides a non-local feature generator to generate features which contains shift among extracted features from feature extraction block. Also, the proposed system exploits non-local behavior by merging non-local features to reduce more computational cost than other deep-learning methods.

The yet another objective of the invention is to provide a non-local feature merge block (NLFMB) model is introduced within the non-local feature enhancement module to reveal the relationship of feature pixels.

The another objective of the invention is to provide a non-local feature merge block to rectify translated features and improve non-local feature further and a reconstruction unit to reconstruct the rectified features.

Yet another objective of the invention is to provide a condition map, the condition map is either of a noise level map for de-noising and sharpness weights for sharpening.

Another objective of the invention is to provide a non-local feature generator creates nine sets of features in nine directions by translating the features. Moreover, the 9 directions translations are provided with a proper shift.

Another objective of the invention is to provide a non-local feature enhancement block includes a deep-learning blocks to avoid creating large motion among features.

The other objective of the invention is to provide a deep-learning block is either a Deformable Convolutional Network, or a Self-attention mechanism or a Three Dimensional Convolutional Network. The DCN reveals relationship among the features, to warp features for feature registration. The Self-attention mechanism pays attention on pixel relationship.

Other objectives and aspects of the invention will become apparent from the following detailed description, taken in conjunction with the accompanying drawings, which illustrate, by way for example, the features in accordance with embodiments of the invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments. The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE DRAWINGS

In image processing, similarity pixels or features to do de-noise, de-blur, super-resolution, etc are used. However, if we want to find more close similarity features, more calculation needs to pay. Especially in the traditional way, it is not only inefficient but imprecise. Recently, deep-learning models can reach a good performance at many image enhancement tasks which need pixel relationship to solve problem, such as super-resolution, de-noising, de-blurring, etc. To improve non-local performance and exploit the ability of deep-learning network, we propose an end-to-end trainable and guided method, including feature extraction block, non-local feature generator, non-local feature enhancement block, to deal with low-level image problem by using the non-local feature concept.

Image(s) could be sent into Feature Extraction Block (FEB) to extract features. A set of abstract features is ready to generate non-local features by Non-local Feature Generator (NLFG). NFG translates features in 9 directions with a manually designed shift to create non-local condition. Then, Non-local Feature Enhancement Block (NLFEB) takes these non-local features to do image enhancement operation. In NLFEB, we introduce non-local feature merge block (NLFMB) model to reveal the relationship of feature pixels. NLFMB can rectify translated features and improve non-local feature further. Finally, Rectified features can be reconstructed by next model with proper condition maps for unique enhancement purpose. In followed section, we will describe this system in detail.

Figure 1A:
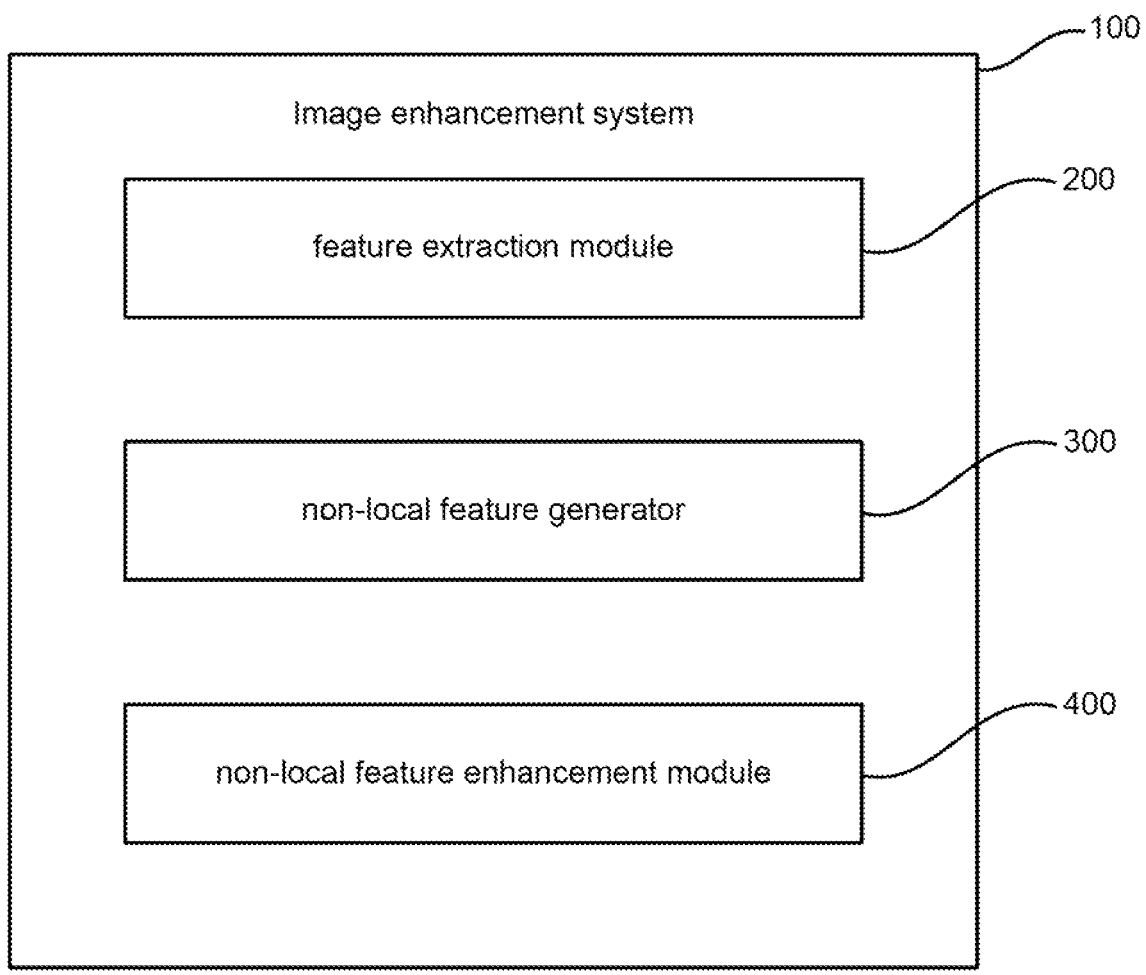
FIG. 1A illustrates an image enhancement system in accordance with the present invention.

FIG. 1A illustrates an image enhancement system 100 in accordance with the present invention. An image enhancement system 100 for enhancing an image includes a feature extraction module 200, a non-local feature generator 300 and a non-local feature enhancement module 400. The feature extraction module 200 for receiving the image and extracting features to obtain details for helping enhancement. The system 100 considers single frame or multi-frame as input, to help image merging and feature extraction. The recommended network could contain many popular blocks to be considered, for motion estimation on image level. The system 100 includes deformable convolutional network instead of traditional convolutional network to overcome the shortcoming of the latter, i.e., unable to process deformable object and features.

The feature extraction module 200 further includes a processing unit and an extraction unit. The processing unit processes one or more frame of the image to generate one or more feature merge layers. The processing unit concatenates the one or more feature merge layers with a condition map to form one or more merged feature maps. The extraction unit extracts a number of feature extraction layers from the one or more merged feature maps. The extraction unit extracts multiple features from the number of feature extraction layers.

The non-local feature generator 300 translates the multiple features to form one or more translated feature maps. NLFG creates multiple set of features in different directions by translating the features after AFEB block. Different directions based translation should be given a proper shift. Based on the computational cost involved, multiple direction based translation can be adjusted with a small count of four translations. However, keeping in mind good effect associated with the overall process, a multiple direction based translation can also be a nine direction translations. Large motion among translated features can be considered as non-local behavior on temporal dimension, because the same region of features among translated features may be like each other which origins from original features sent by AFEB.

To achieve this purpose, several manually designed large shift should be chosen at the beginning of inference, e.g. nine, fifteen, twenty-one etc. Eventually, network does not need to take additional calculation for searching non-local pixels or features means more efficient for de-noise.

The non-local feature enhancement module 400 merges the one or more translated feature maps to form one or more non-local merged feature maps. The non-local feature enhancement module includes a reconstruction unit and a concatenating unit. The reconstruction unit constructs a number of reconstruction layers from the one or more non-local merged feature maps. The concatenating unit concatenates the number of reconstruction layers with the condition map to form an enhanced image.

Non-Local Feature Merge Block (NLFMB) is obtained not only from spatial dimension but also from temporal dimension by repeat inherent pattern at 9 directions. Meanwhile, NLFMB also could suppress unrelated information when processing, such as motion ghost caused by NLFG block creates large motion among features. We suggest some deep-learning blocks or networks to solve this problem, includes a Deformable Convolutional Network V2, a Self-Attention Block and a three dimensional Convolutional Network (3DCNN).

After non-local features merged, reconstruction model can be designed as many popular CNN models as single-frame Feature Extraction section mentioned. Many types of condition map could be used with merged features into this reconstruction model. It depends on which task is in operation. For example, if we want to adopt these blocks to do de-noise, the condition map could be made from noise level coefficients. Or, if the task is super-resolution, the condition map could be a priori degraded kernel (e.g., bi-cubic down sampling kernel) to guide model reconstruction.

The non-local features need a merge block to suppress unrelated features because of we created nine directions non-local features. The system uses a channel-attention block to decide which direction of non-local features network wants to keep. To overcome ghosts and artifacts in some areas which is caused by NLFG, we add a deformable convolution block after attention block to extract useful information from feature maps. This network could achieve good image de-noising quality and use a few calculation costs by using non-local feature generator.

Figure 1B:
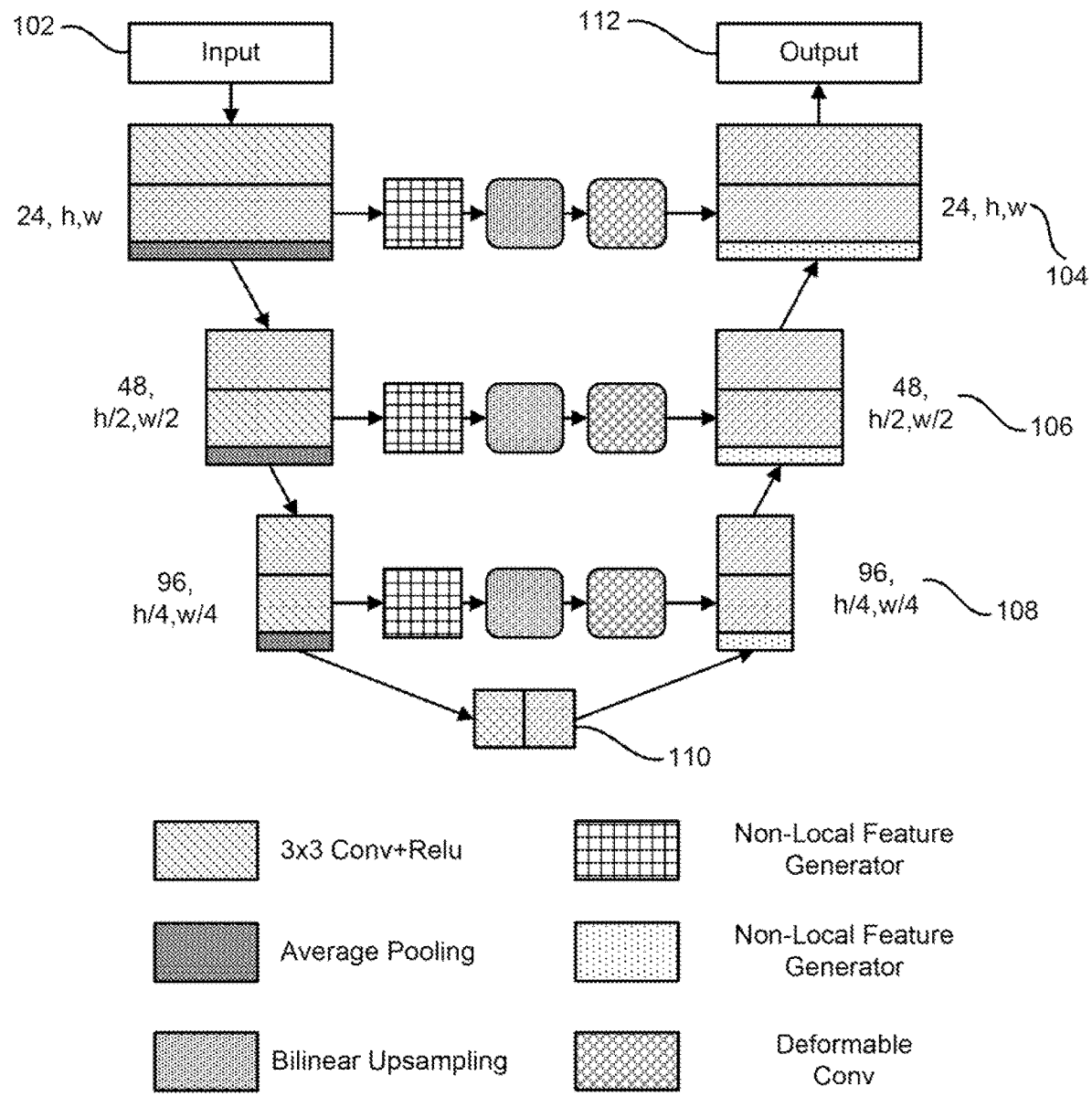
FIG. 1B illustrates a schematic representation of the image enhancement system in accordance with the invention.

FIG. 1B illustrates the image enhancement system in accordance with the invention. The invention discloses a deep learning model design with Non-local Feature Block. Image(s) could be sent as an input 102 to Feature Extraction Block (FEB) to extract features. A set of abstract features is ready to generate non-local features by Non-local Feature Generator (NLFG). NFG translates features in 9 directions with a manually designed shift to create non-local condition. Then, Non-local Feature Enhancement Block (NLFEB) takes these non-local features to do image enhancement operation.

In NLFEB, we introduce non-local feature merge block (NLFMB) model to reveal the relationship of feature pixels. NLFMB can rectify translated features and improve non-local feature further in various stages 24 h,w (104), 48 h/2, w/2 (106) and 96 h/4, w/4 (108) creating three dimensional convoluted features (110). Finally, rectified features as an output (112) can be reconstructed by next model with proper condition maps for unique enhancement purpose.

The network is based on the standard U-Net with the following components. First, we introduce our NLFG block to get the non-local features from each resolution level in our U-Net encoder. We choose to create non-local features in encoder part because of the encoder could save more high-frequency details than decoder part. The decoder could take charge of de-noising task to get low-frequency area against non-local features. As we mentioned above, non-local features need a merge block to suppress unrelated features because of we created 9 directions non-local features. The system uses a channel-attention block to decide which direction of non-local features network wants to keep. To overcome ghosts and artifacts in some areas which is caused by NLFG, we add a deformable convolution block after attention block to extract useful information from feature maps. This network could achieve good image de-noising quality and use a few calculation costs by using non-local feature generator.

Figure 2A:
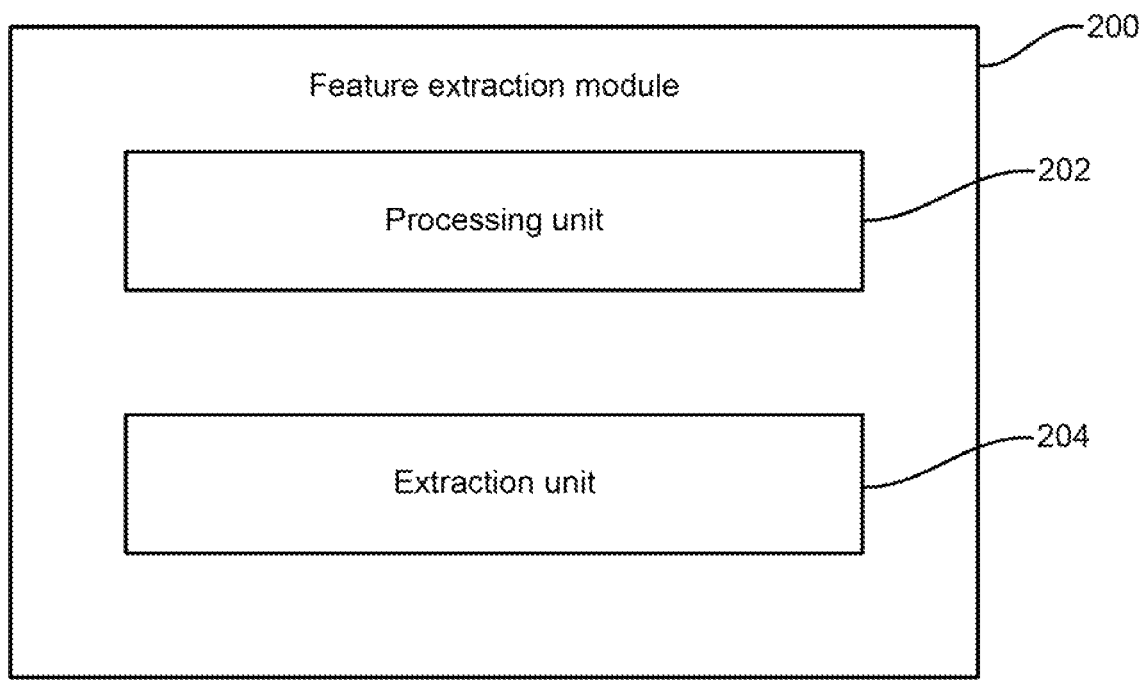
FIG. 2A illustrates a feature extraction module of the image enhancement system in accordance with the invention.

FIG. 2A illustrates a feature extraction module 200 of the image enhancement system. The feature extraction module 200 for receiving the image includes a processing unit 202 and an extraction unit 204. The processing unit 202 processes at least one frame of the image to generate a multiple feature merge layers. The processing unit 202 concatenates at least one of the multiple feature merge layers with a condition map to form one or more merged feature maps.

The extraction unit 204 extracts a number of feature extraction layers from the one or more merged feature maps.

The extraction unit 204 extracts multiple features from the number of feature extraction layers.

The system obtains details for helping image enhancement. Meanwhile, it can be also adopted by both multi-frame and single-frame conditions. The system manually chooses which condition would be proper for using.

Multi-frame Feature Extraction: To increase sampling would bring more information for image enhancement, so the multi-frame system usually takes this benefit on image enhancement task, such as de-noise, de-blur, super-resolution, etc. A multi-frame feature extraction procedure for reference. Although, multi-frame system usually could refine more information than single-image system, relative motion would always exist among frames which is a most important problem need to be taken account into frame merging before feature extraction.

Single-frame Feature Extraction Feature extraction model in MFE can be reused by single-frame feature extraction pipeline. If the system adopts single-frame as input, many popular CNN models or blocks have kind of ability which was designed to extract feature efficiently and effectively.

Figure 2B:
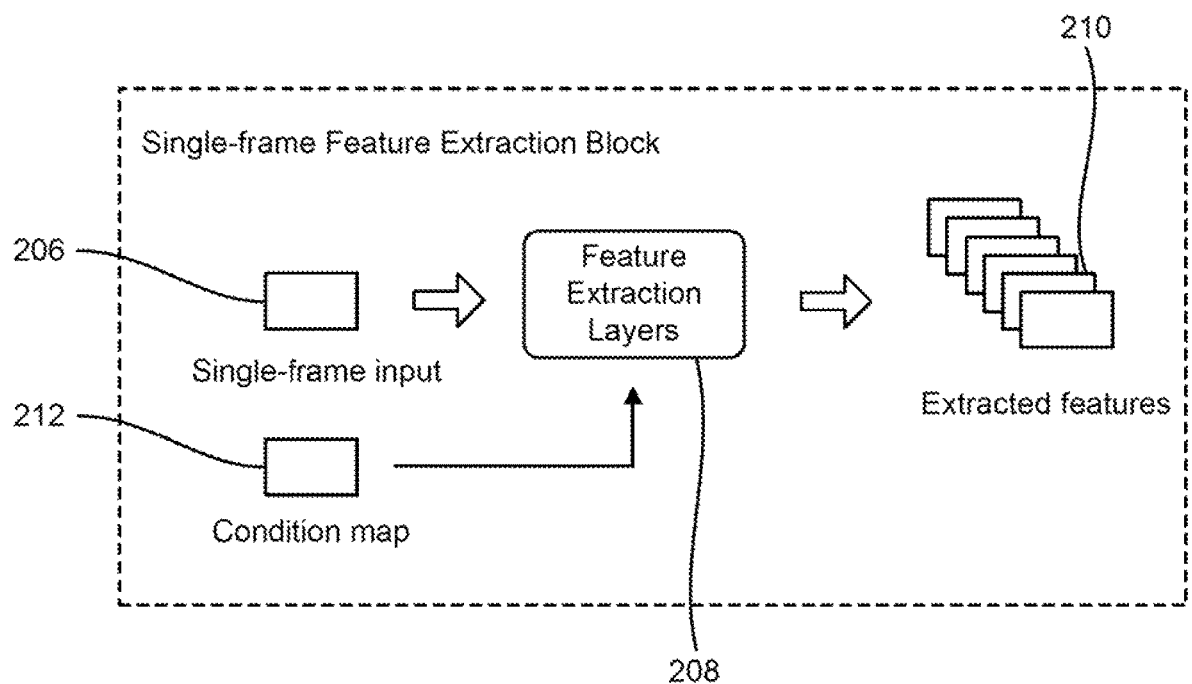
FIG. 2B illustrates single frame feature extraction in the feature extraction module in accordance with the invention.

FIG. 2B illustrates single frame feature extraction in the feature extraction module in accordance with the invention. Single-frame Feature Extraction: Feature extraction model in MFE can be reused by single-frame feature extraction pipeline. The system adopts single-frame as input 206, many popular CNN models or blocks have kind of ability which was designed to extract feature efficiently and effectively. Not only popular block, ResNet, MobileNet, NASNet, but also stacking the residual block or back-projection model would be a good choice to achieve large receptive field.

A condition map 212 can be concatenated onto some specific layers in feature extraction layers 208 forming extracted features 210, which is additional information for reference, for example, it could be noise level map for de-noising, or sharpness weights for sharpening.

Figure 2C:
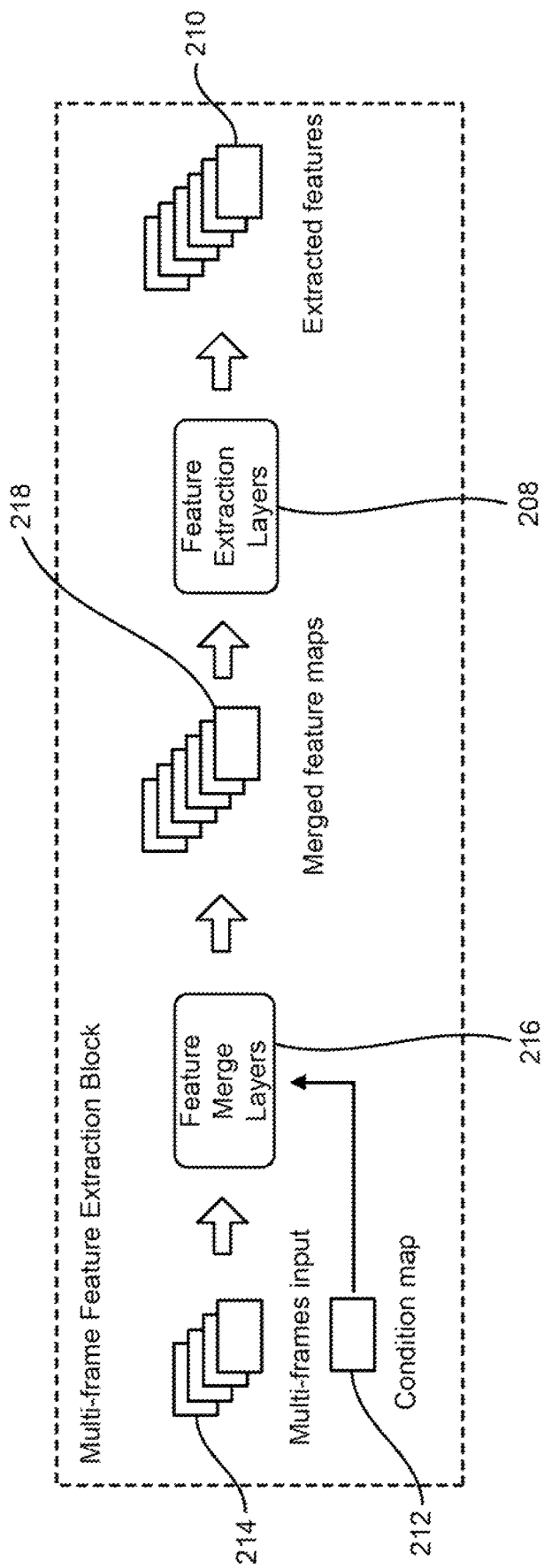
FIG. 2C illustrates multi-frame feature extraction in the feature extraction module in accordance with the invention.

FIG. 2C illustrates multi-frame feature extraction in the feature extraction module in accordance with the invention. Multi-frame Feature Extraction: To increase sampling would bring more information for image enhancement, so the multi-frame system usually takes this benefit on image enhancement task, such as denoise, deblur, super-resolution, etc. A multi-frame feature extraction procedure for reference receives multiple frames input 214 and give extracted features 210 as output which may be similar or different to single-frame feature extraction.

Although, multi-frame system usually could refine more information than single-image system, relative motion would always exist among frames which is a most important problem need to be taken account into frame merging before feature extraction. In other words, if our system chooses multi-frame as input 214, a good motion estimation can help image merging to form feature merge layers 216 and feature extraction to form feature extraction layers 208 through merged feature maps 218. The recommended network could contain many popular blocks to be considered, for motion estimation on image level, using deformable convolutional network instead of traditional convolutional network can overcome the shortcoming of the latter, i.e., unable to process deformable object and features.

A condition map 212 can be concatenated onto some specific layers, which is an additional information for reference, for example, it could be noise level map for de-noising, or sharpness weights for sharpening.

Figure 3A:
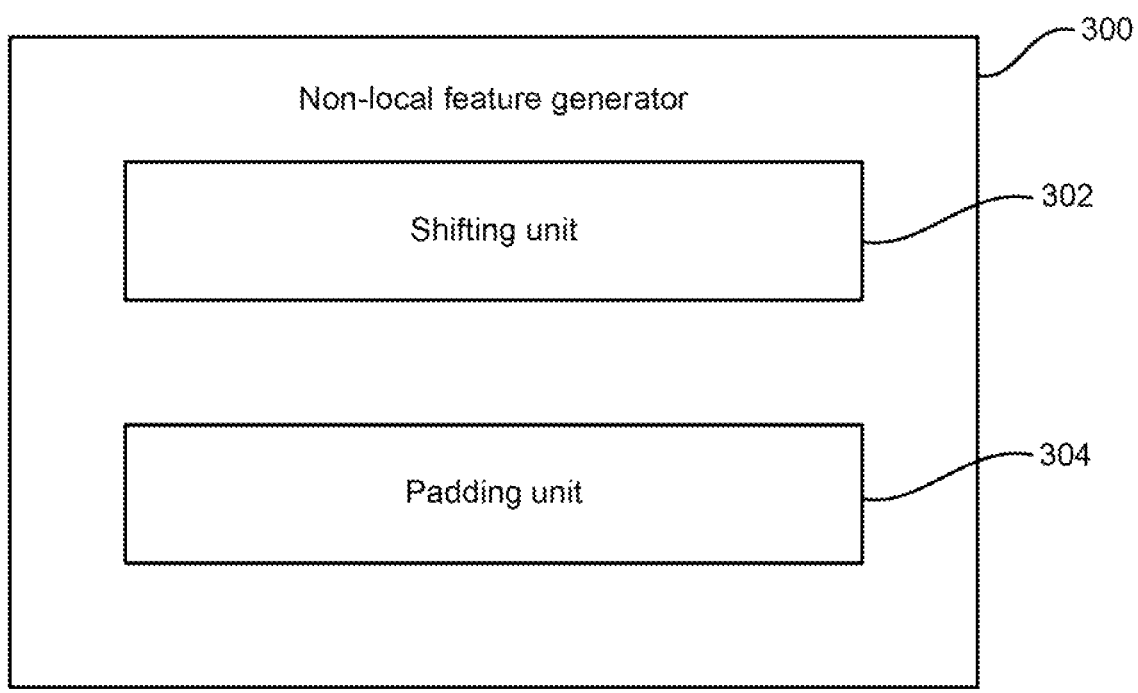
FIG. 3A illustrates a non-local feature generator of the feature enhancement system in accordance with the invention.

FIG. 3A illustrates a non-local feature generator of the feature enhancement system. The non-local feature generator 300 includes a shifting unit 302 and a padding unit 304.

The shifting unit 302 applies a shift in nine distinct directions on the multiple features to form multiple feature translation layers. The padding unit 304 fixes the shift on the multiple feature translation layers by applying padding and cropping operations to form one or more translated feature maps.

Figure 3B:
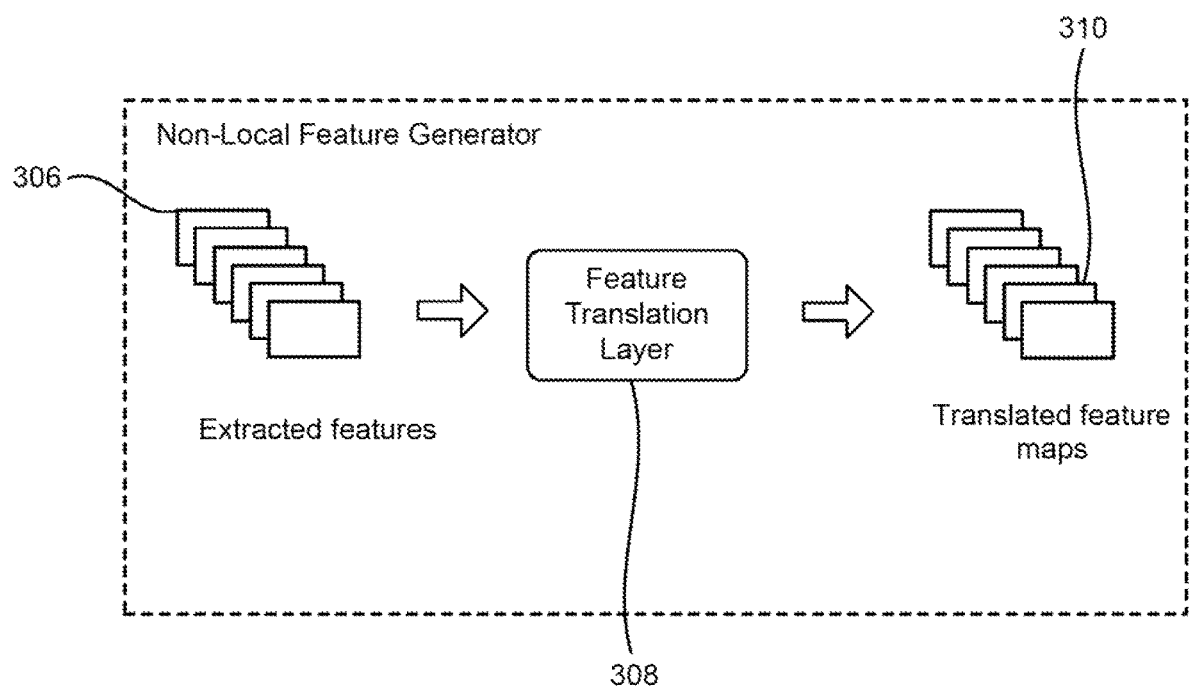
FIG. 3B illustrates a schematic representation of the non-local feature generator in accordance with the invention.

FIG. 3B illustrates a non-local feature generator in accordance with the invention. The non-local feature generator 300 looks for spatial similarity through temporal dimension, which can reduce computational cost. NLFG 300 creates nine sets of features in nine directions by translating the features after AFEB block. Nine directions translation should be given with a proper shift to form feature translation layer 308 from extracted features 306 and finally forming translated feature maps 310. Large motion among translated features can be considered as non-local behavior on temporal dimension, because the same region of features among translated features may be like each other which origins from original features sent by AFEB. To achieve this purpose, several manually designed large shift should be chosen in the beginning of inference, e.g. 9, 15, 21, etc.

Eventually, network does not need to take additional calculation for searching non-local pixels or features means more efficient for de-noise.

Figure 3C:
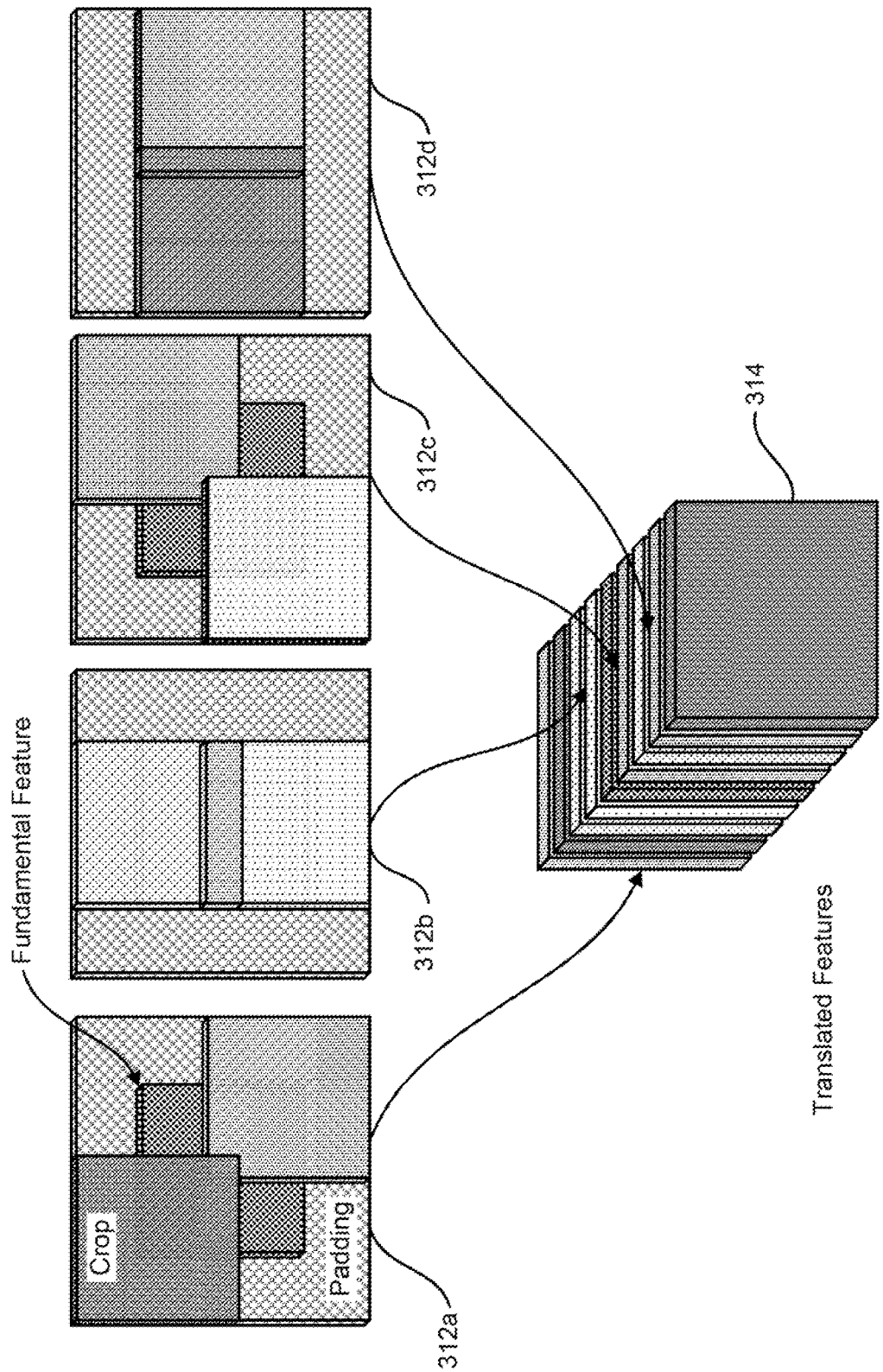
FIG. 3C illustrates padding and cropping operations in the non-local feature generator in accordance with the invention.

FIG. 3C illustrates padding and cropping in the non-local feature generator in accordance with the invention. In one embodiment, the padding can be, and not limited to, zero padding, mirror padding or edge wrap padding. If manually designed shift is named K, 4 edges padding size should be [K,K,K,K], and 9-direction patches left-top points should be [-k,-k], [-k,0],[-k,k],[0,-k],[0,0],[0,k],[k,-k],[k,0],[k,k] forming various cropping and padding pattern (312a-312d) later forming translated features 314.

To be noticed, this block does not contain any trainable weights, only caches translated feature data to fulfill back-propagation automatically in popular deep-learning training architectures, such as Tensor Flow, PyTorch, etc. This block could save computational cost against other deep learning based non-local approach. Unlike the method, uses a non-local approach to do image processing. The non-local block that needs to do three flatten operations a non-local block that needs to do three flatten operations and dot products in each dimension (height, width, channel), which means the computational cost would highly grow up as feature size was slightly increased.

Figure 4A:
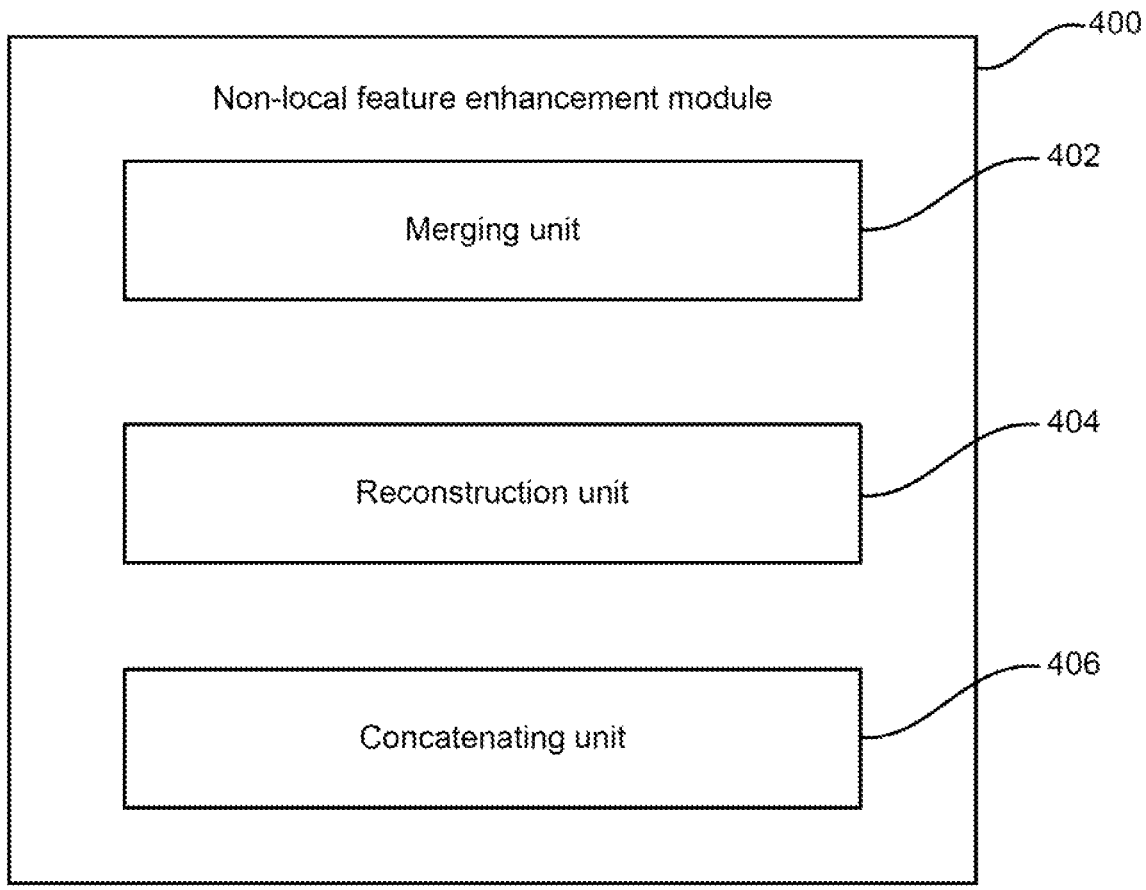
FIG. 4A illustrates a non-local feature enhancement module of the image enhancement system.

FIG. 4A illustrates a non-local feature enhancement module of the image enhancement system. The non-local feature enhancement module 400 includes a merging unit 402, a reconstruction unit 404 and a concatenating unit 406. The merging unit 402 merges the one or more translated feature maps to form one or more non-local merged feature maps. The reconstruction unit 404 constructs a number of reconstruction layers from the one or more non-local merged feature maps. The concatenating unit 406 concatenates the number of reconstruction layers with the condition map to form an enhanced image.

After non-local features merged, reconstruction model can be designed as many popular CNN models as single-frame Feature Extraction section mentioned. Many types of condition map could be used with merged features into this reconstruction model. It depends on which task is in operation. For example, if we want to adopt these blocks to do denoise, the condition map could be made from noise level coefficients. Or, if the task is super-resolution, the condition map could be a priori degraded kernel (e.g., bi-cubic down sampling kernel) to guide model reconstruction.

Figure 4B:
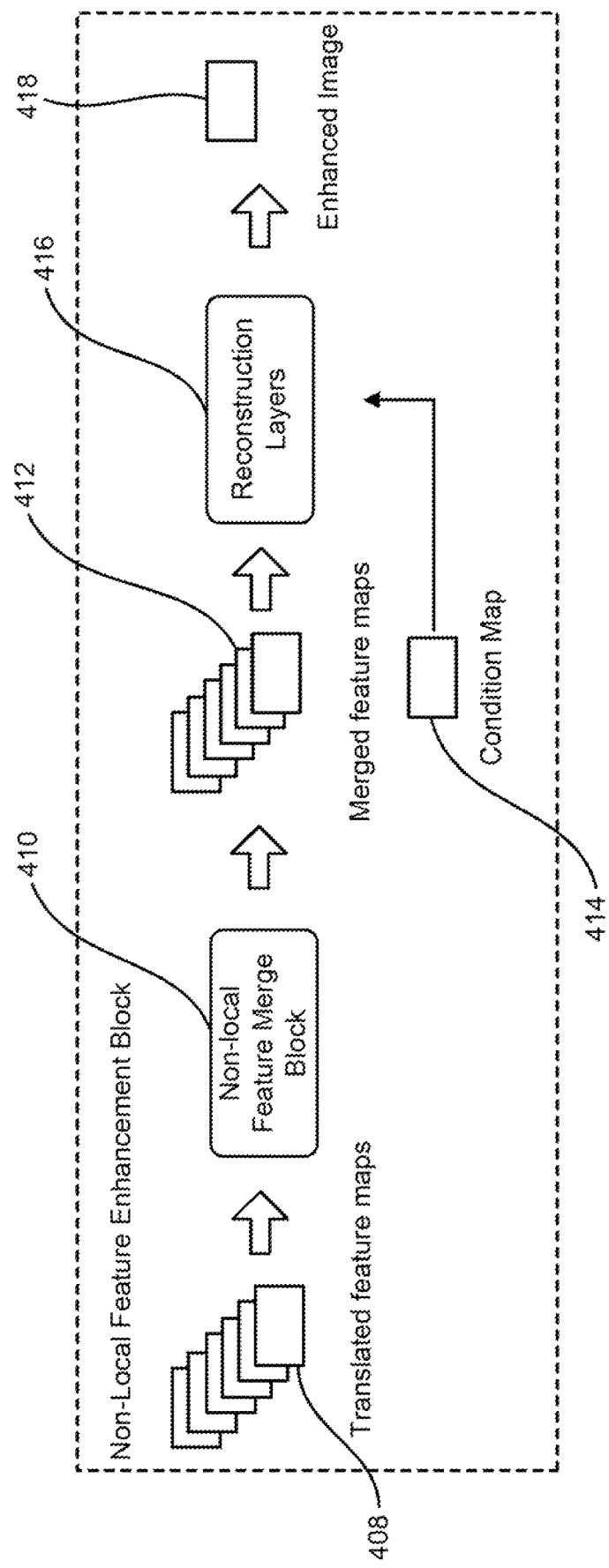
FIG. 4B illustrates a schematic representation of the non-local feature enhancement module in accordance with the invention.

FIG. 4B illustrates a non-local feature enhancement module in accordance with the invention. Although the shift among features could overlap similar features to each other to bring non-local behavior, it also could make ghosts and artifacts in some areas when unlike features overlapped. To overcome this disadvantage, the invention proposes a Non-Local Feature Merge Block (NLFMB) which receives the translated feature maps 408 as input on which the NLFMB 410 works to form merged feature maps 412 later forming reconstruction layers 416. The condition maps 414 are applied on the merged feature maps forming an enhanced image 418. In this block, non-local characteristic could be obtained not only from spatial dimension but also from temporal dimension by repeat inherent pattern at 9 directions. Meanwhile, NLFMB also could suppress unrelated information when processing, such as motion ghost caused by NLFG block creates large motion among features. We suggest some deep-learning blocks or networks to solve this problem, including but not limited to:

Deformable Convolutional Network V2 [18]: DCN has an extraordinary ability of revealing imply relationship among features, it can be used to warp features for feature registration instead of using pixel-level algorithm to estimate motion in traditional way. Offsets by trained can be considered as flow map among features on feature space. It has diversity on same location of each feature to make sure existing the characteristic of non-local feature after registration.

A trainable mask map introduced in DCNV2, can suppress 'bad' features caused by outlier of trainable offset, especially at motion area. In our method, DCNV2 could enhance to capture non-local characteristic which uses trainable offsets to find out the better non-local feature position and warped back. Meanwhile, DCNV2 also could reduce to involve unrelated features, for example, large local motion.

Self-Attention Block: Self-attention mechanism has already been popular in recent years. Unlike DCN, the block pays more attention on pixel relationship between two features but no warping operation. An attention weight map is given to features for reference. It is more like a connection but not switch which DCN plays to help network find out useful information. In [9], there are two kinds of self-attention mechanisms, spatial attention, and temporal attention, to consider two dimensions condition simultaneously in some case, e.g., video enhancement.

3D Convolutional Network (3DCNN): If self-attention block has a temporal paradigm, 3D-CNN could also be involved into feature merging operation. In sequence, 3D-CNN could obtain more information and find its inherent characteristic. In some cases, features could be combined in the third dimension and provide it as input to the model to extract both temporal and spatial features from the sequence. By designing the network to have a large enough receptive field, it would have full coverage of the sequence and hence, output features that consider information from the whole sequence.

After non-local features merged, reconstruction model can be designed as many popular CNN models as single-frame Feature Extraction section mentioned. Many types of condition map could be used with merged features into this reconstruction model. It depends on which task is in operation. For example, to adopt these blocks to do denoise, the condition map could be made from noise level coefficients. Or, if the task is super-resolution, the condition map could be a priori degraded kernel (e.g., bicubic down sampling kernel) to guide model reconstruction.

Figure 5A:
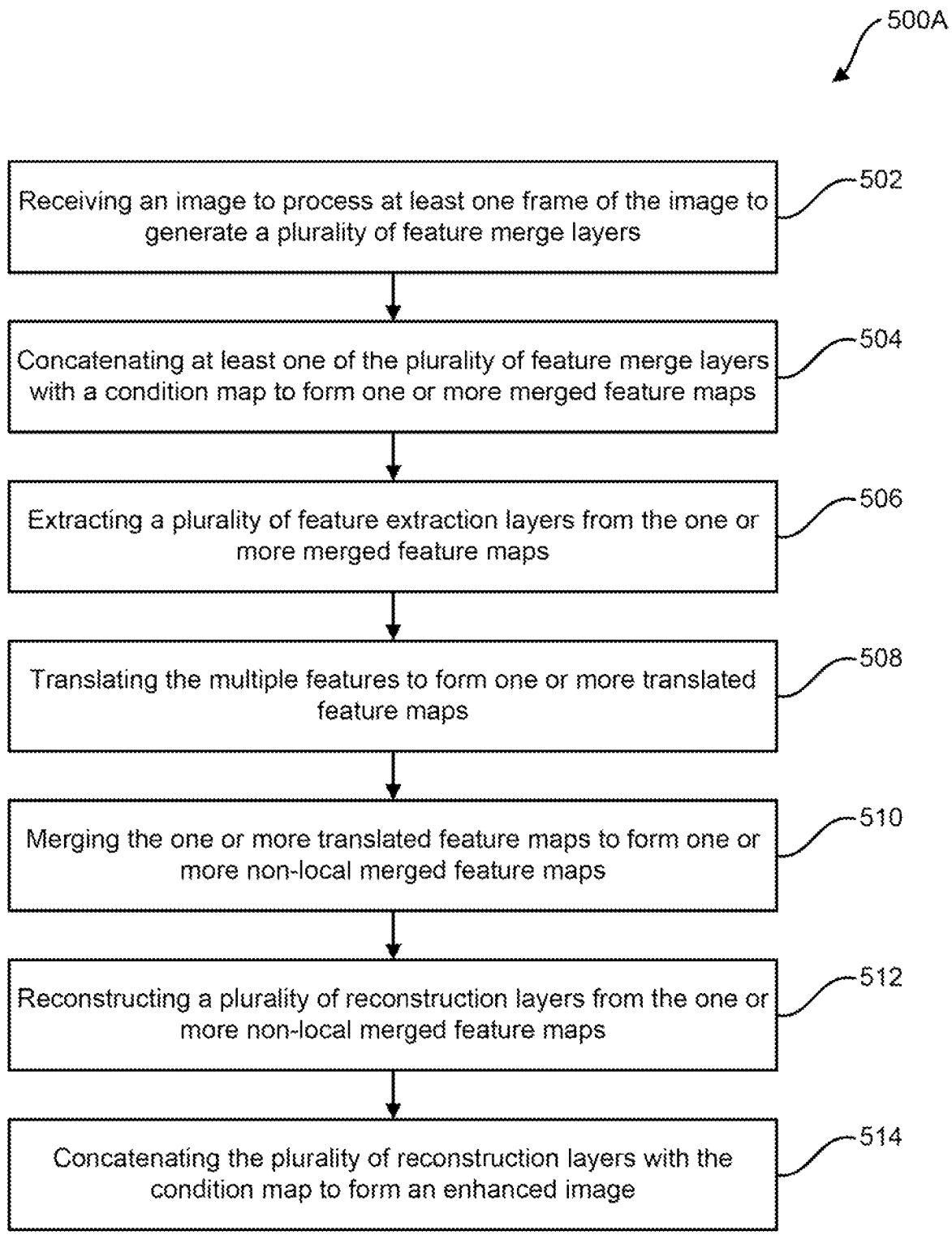
FIG. 5A illustrates a method for enhancing an image in accordance with the present invention.

FIG. 5A illustrates a method for enhancing an image. The method includes receiving an image by a feature extraction module to process at least one frame of the image for generating a number of feature merge layers 502. Followed with, concatenating at least one of the number of feature merge layers with a condition map to form one or more merged feature maps 504. Extracting, a number of feature extraction layers from the one or more merged feature maps to extract multiple features from the number of feature extraction layers 506.

Later translating, the multiple features to form one or more translated feature maps 508 by a non-local feature generator. Followed with, merging the one or more translated feature maps to form one or more non-local merged feature maps 510. Then, reconstructing a number of reconstruction layers from the one or more non-local merged feature maps 512 and finally concatenating the number of reconstruction layers with the condition map to form an enhanced image 514 by a non-local feature enhancement module.

Figure 5B:
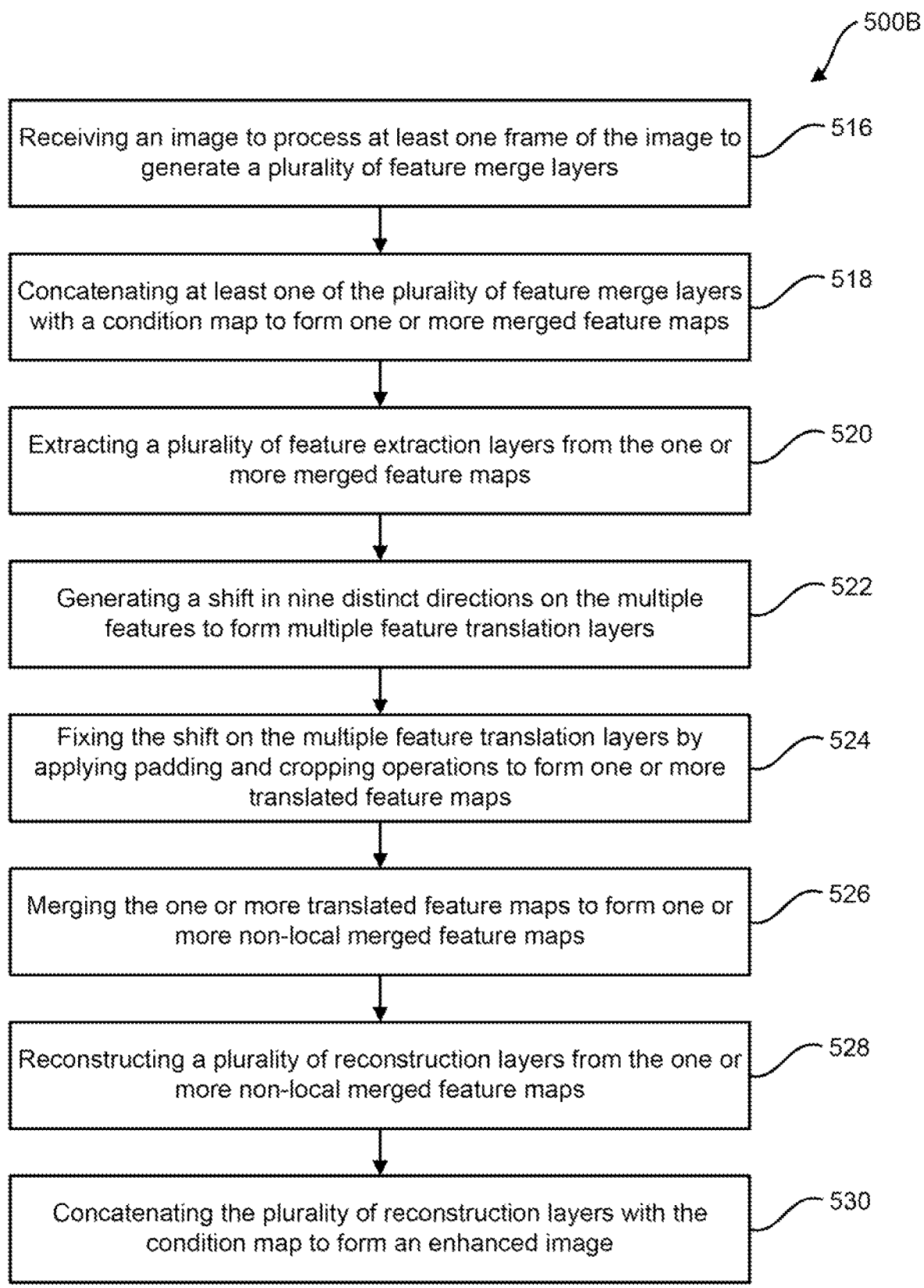
FIG. 5B illustrates another method for enhancing an image based on non-local features.

FIG. 5B illustrates a method for enhancing an image based on non-local features. The method includes firstly, receiving an image to process at least one frame of the image for generating a number of feature merge layers 516 by a feature extraction module. Secondly, concatenating at least one of the number of feature merge layers with a condition map to form one or more merged feature maps 518. Extracting, a number of feature extraction layers from the one or more merged feature maps to extract multiple features from the number of feature extraction layers 520.

Generating a shift in nine distinct directions on the multiple features to form multiple feature translation layers 522. Followed with, fixing the shift on the multiple feature translation layers by applying padding and cropping operations to form one or more translated feature maps 524 by a non-local feature generator. Followed with, merging the one or more translated feature maps to form one or more non-local merged feature maps 526. Then, reconstructing a number of reconstruction layers from the one or more non-local merged feature maps and finally concatenating the number of reconstruction layers with the condition map to form an enhanced image 528 by a non-local feature enhancement module.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. An image enhancement system for enhancing an image, wherein the image enhancement system comprising:
    a feature extraction module for receiving the image, wherein the feature extraction module further comprising:
        a processing unit, wherein the processing unit processes at least one frame of the image to generate a number of feature merge layers, further wherein the processing unit concatenates at least one of the number of feature merge layers with a condition map to form one or more merged feature maps; and
        an extraction unit, wherein the extraction unit extracts a number of feature extraction layers from the one or more merged feature maps, further wherein the extraction unit extracts multiple features from the number of feature extraction layers;
    a non-local feature generator, wherein the non-local feature generator translates the multiple features to form one or more translated feature maps; and
    a non-local feature enhancement module, wherein the non-local feature enhancement module merges the one or more translated feature maps to form one or more non-local merged feature maps, further wherein the non-local feature enhancement module comprising:
        a reconstruction unit, wherein the reconstruction unit constructs a number of reconstruction layers from the one or more non-local merged feature maps; and
        a concatenating unit, wherein the concatenating unit concatenates the number of reconstruction layers with the condition map to form an enhanced image.

2. The image enhancement system in accordance with claim 1, wherein a non-local feature merge block (NLFMB) model within the non-local feature enhancement module identifies relationship between pixels to form the enhanced image.

3. The image enhancement system in accordance with claim 2, wherein the non-local feature merge block (NLFMB) checks and rectifies the one or more translated feature maps before forming the one or more non-local merged feature maps.

4. The image enhancement system in accordance with claim 1, wherein the condition map is either a noise level map for de-noising.

5. The image enhancement system in accordance with claim 1, wherein the condition map enhances the image by applying sharpness weights on the number of feature merge layers to form the one or more merged feature maps.

6. The image enhancement system in accordance with claim 1, wherein the non-local feature generator checks spatial similarity through temporal dimension to reduce computational cost.

7. The image enhancement system in accordance with claim 1, wherein the non-local feature generator generates nine distinct directions on the multiple features to form the multiple feature translation layers.

8. The image processing system in accordance with claim 1, wherein the non-local feature enhancement module includes a deep-learning block to avoid creating large shift amongst the number of feature extraction layers.

9. The image processing system in accordance with claim 8, wherein the deep-learning block is based on either of a Deformable Convolutional Network (DCN), a Self-attention mechanism and a three-dimensional Convolutional Network.

10. The image processing system in accordance with claim 9, wherein the DCN identifies relationship amongst the one or more non-local merged feature maps for registration purpose.

11. The image processing system in accordance with claim 9, wherein the Self-attention mechanism checks pixel relationship of the one or more non-local merged feature maps.

12. The image processing system in accordance with claim 9, wherein the Self-attention mechanism includes a spatial attention and a temporal attention.

13. The image processing system in accordance with claim 9, wherein the three-dimensional Convolutional Network merges the one or more translated feature maps to identify at least one translated feature map to form the one or more non-local merged feature maps.

14. The image processing system in accordance with claim 1, wherein the non-local feature generator extracts the multiple features in a U-Net encoder.

15. An image processing system for processing an image based on non-local features, wherein the image processing system comprising:
    a feature extraction module for receiving the image, wherein the feature extraction module further comprising:
        a processing unit, wherein the processing unit processes at least one frame of the image to generate a number of feature merge layers, further wherein the processing unit concatenates at least one of the number of feature merge layers with a condition map to form one or more merged feature maps; and
        an extraction unit, wherein the extraction unit extracts a number of feature extraction layers from the one or more merged feature maps, further wherein the extraction unit extracts multiple features from the number of feature extraction layers;
    a non-local feature generator, wherein the non-local feature generator comprising:
        a shifting unit, wherein the shifting unit applies a shift in nine distinct directions on the multiple features to form multiple feature translation layers; and
        a padding unit, wherein the padding unit fixes the shift on the multiple feature translation layers by applying padding and cropping operations to form one or more translated feature maps;
    a non-local feature enhancement module, wherein the non-local feature enhancement module comprising:
        a merging unit, wherein the merging unit merges the one or more translated feature maps to form one or more non-local merged feature maps;
        a reconstruction unit, wherein the reconstruction unit constructs a number of reconstruction layers from the one or more non-local merged feature maps; and
        a concatenating unit, wherein the concatenating unit concatenates the number of reconstruction layers with the condition map to form an enhanced image.

16. A method for enhancing an image, wherein the method comprising:
    receiving an image to process at least one frame of the image for generating a number of feature merge layers;
    concatenating at least one of the number of feature merge layers with a condition map to form one or more merged feature maps;

extracting a number of feature extraction layers from the one or more merged feature maps to extract multiple features from the number of feature extraction layers;
translating the multiple features to form one or more translated feature maps;
merging the one or more translated feature maps to form one or more non-local merged feature maps;
reconstructing a number of reconstruction layers from the one or more non-local merged feature maps; and
concatenating the number of reconstruction layers with the condition map to form an enhanced image.

17. A method for enhancing an image based on non-local features, wherein the method comprising:
receiving an image to process at least one frame of the image to generate a number of feature merge layers;
concatenating at least one of the number of feature merge layers with a condition map to form one or more merged feature maps;
extracting a number of feature extraction layers from the one or more merged feature maps to extract multiple features from the number of feature extraction layers;
generating a shift in nine distinct directions on the multiple features to form multiple feature translation layers;
fixing the shift on the multiple feature translation layers by applying padding and cropping operations to form one or more translated feature maps;
merging the one or more translated feature maps to form one or more non-local merged feature maps;
reconstructing a number of reconstruction layers from the one or more non-local merged feature maps; and
concatenating the number of reconstruction layers with the condition map to form an enhanced image.

18. A computer program product comprising a non-transitory computer useable medium having computer program logic for enabling at least one processor in a computer system enhancing an image via a software platform, said computer program logic comprising:
receiving an image to process at least one frame of the image for generating a number of feature merge layers;
concatenating at least one of the number of feature merge layers with a condition map to form one or merged feature maps;
extracting a number of feature extraction layers from the one or more merged feature maps to extract multiple features from the number of feature extraction layers;
translating the multiple features to form one or more translated feature maps;
merging the one or more translated feature maps to form one of more non-local merged feature maps;
reconstructing a number of reconstruction layers from one or more non-local merged feature maps; and
concatenating the number of reconstruction layers with the condition map to form an enhanced image.

19. A computer program product comprising a non-transitory computer useable medium having computer program logic for enabling at least one processor in a computer system for enhancing an image based on non-local features via a software platform, said computer program logic comprising:
receiving an image to process at least one frame of the image to generate a number of feature merge layers;
concatenating at least one of the number of feature merge layers with a condition map to form one or more merged feature maps;
extracting a number of feature extraction layers from the one or more merged feature maps to extract multiple features from the number of feature extraction layers;
generating a shift in nine distinct directions on the multiple features to form multiple feature translation layers;
fixing the shift on the multiple feature translation layers by applying padding and cropping operations to form one or more translated feature maps;
merging the one or more translated feature maps to form one or more non-local merged feature maps;
reconstructing a number of reconstruction layers from the one or more non-local merged feature maps; and
concatenating the number of reconstruction layers with the condition map to form an enhanced image.

* * * * *